(12) United States Patent
Ko

(10) Patent No.: US 10,470,596 B2
(45) Date of Patent: Nov. 12, 2019

(54) HOOK ASSEMBLY

(71) Applicant: NATIONAL PINGTUNG UNIVERSITY OF SCIENCE & TECHNOLOGY, Pingtung County (TW)

(72) Inventor: Chien-Ho Ko, Pingtung County (TW)

(73) Assignee: NATIONAL PINGTUNG UNIVERSITY OF SCIENCE & TECHNOLOGY, Pingtung County (TW)

( * ) Notice: Subject to any disclaimer, the term of this patent is extended or adjusted under 35 U.S.C. 154(b) by 0 days.

(21) Appl. No.: 16/210,194

(22) Filed: Dec. 5, 2018

(65) Prior Publication Data
US 2019/0167019 A1 Jun. 6, 2019

(30) Foreign Application Priority Data
Dec. 6, 2017 (TW) .............................. 106142779 A

(51) Int. Cl.
A47G 1/17 (2006.01)
A47G 1/20 (2006.01)
F16B 45/00 (2006.01)
F16B 47/00 (2006.01)

(52) U.S. Cl.
CPC ............... A47G 1/17 (2013.01); A47G 1/20 (2013.01); F16B 45/00 (2013.01); F16B 47/003 (2013.01); A47G 1/175 (2013.01)

(58) Field of Classification Search
CPC . A47G 1/17; A47G 1/175; A47G 1/20; A47G 1/202; A47G 1/205; A47G 2001/207; F16B 45/00; F16B 47/003; A47F 5/0006
USPC .............................. 248/467, 303–307, 309.1
See application file for complete search history.

(56) References Cited

U.S. PATENT DOCUMENTS
9,089,226 B2 * 7/2015 Kling .................... A47G 1/175

FOREIGN PATENT DOCUMENTS
TW           M520580 U      4/2016

* cited by examiner

Primary Examiner — Nkeisha Smith
(74) Attorney, Agent, or Firm — WPAT, PC

(57) ABSTRACT

A hook assembly includes a base having a chamber, a hook portion provided on a bottom of the base, and a lean indicator mounted in the base via a second pivotal portion. The base includes an opening, a window portion, and an adhesion portion which is adhered to a surface. The adhesion portion and the opening are provided on a back plate. The base includes two first pivotal portions. A center of each first pivotal portion is spaced from the surface at a spacing. The lean indicator includes first and second faces. The first face has a feature different from that of the second face. A central axis of the second pivotal portion does not pass through a center of gravity of the lean indicator. The central axis of the second pivotal portion is spaced from each edge of the lean indicator at a distance slightly larger than the spacing.

8 Claims, 3 Drawing Sheets

HOOK ASSEMBLY

CROSS REFERENCE TO RELATED APPLICATION

The application claims the benefit of Taiwan application serial No. 106142779, filed on Dec. 6, 2017, and the entire contents of which are incorporated herein by reference.

BACKGROUND OF THE INVENTION

1. Field of the Invention

The present invention generally relates to a hook assembly and, more particularly, to a hook assembly which permits the user to observe whether the hook assembly has unfastened.

2. Description of the Related Art

Hooks are commonly used in people's lives for the purposes of hanging the articles such as clothes, kitchen utensils, keys, calendars, etc. Due to some factors such as poor adhesion of the hooks, uneven or rough surface of the wall, large weight of the articles or the like, the hook often becomes unfastened and drops to the ground, causing damage to the articles or hurting people around by the falling objects.

To solve the problem, another conventional hook was proposed which includes a base and a hooking portion connected to the base. A warning unit and a power supply unit are mounted on the base. The warning unit is electrically connected to the power supply unit. When the base starts to tilt and becomes unfastened, the warning unit issues a warning message to notify the user of the abnormal condition, permitting the user to deal with the situation in advance. However, the conventional hook requires the power supply unit to activate the warning unit and therefore is energy-consuming. Once the power supply unit is short of electricity, the warning unit cannot be activated. Such a conventional hook is seen in Taiwan Patent No. M520580.

In light of the above, it is necessary to improve the conventional hook.

SUMMARY OF THE INVENTION

It is therefore the objective of this invention to provide a hook assembly which permits the user to be aware of the abnormal condition when the hook assembly becomes loosened and starts to tilt. This prevents the article from dropping which adversely causes damage to the article and hurts the people around.

It is another objective of this invention to provide a hook assembly which permits the user to be aware of the abnormal condition without the use of electricity.

In an aspect, a hook assembly includes a base having a chamber, a hook portion provided on a bottom of the base, and a lean indicator pivotally mounted in the chamber of the base via a second pivotal portion. The base includes an adhesion portion, an opening and a window portion. The adhesion portion is configured to be adhered to a surface. The adhesion portion and the opening are provided on a back plate of the base. The opening extends through the back plate of the base and the adhesion portion. The opening has a first width. The window portion intercommunicates with the chamber of the base. The base includes two first pivotal portions respectively provided on two opposite lateral plates of the base. A center of each of the two first pivotal portions is spaced from the surface at a spacing. The lean indicator includes a first face and a second face. The first face has a feature different from that of the second face. The lean indicator has a second width smaller than the first width. A central axis of the second pivotal portion does not pass through a center of gravity of the lean indicator. The central axis of the second pivotal portion is spaced from each of two edges of the lean indicator at a distance. The distance is slightly larger than the spacing.

Based on the above, the base of the hook assembly according to the invention can lean when the base unfastens and detaches from the wall. Since the center of gravity of the lean indicator is located above the second pivotal portion, the lean indicator can remain liable to pivot downwards under the unbalanced center of gravity. As a result, the lean indicator turns over and the second face faces the window portion. Due to the feature difference between the first and second faces of the lean indicator, it is able to observe whether the lean indicator has unfastened. As a result, the user can be aware of the abnormal condition of the hook assembly, preventing the articles from dropping which adversely causes damage to the article and hurts the people around. Furthermore, the hook assembly according to the invention does not require electricity and is still able to provide the user with a notification function.

In an example, the hook assembly further includes a transparent panel coupled with the window portion. Thus, the user can see through the chamber and observe the condition of the lean indicator.

In the example, the second pivotal portion is in a form of a hole extending through the lean indicator from one lateral side to another lateral side of the lean indicator, and a pivoting member extends through the hole and protrudes beyond the lateral sides of the lean indicator. Thus, the lean indicator can be pivotally mounted in the chamber of the base.

In the example, the feature includes at least one of shape, appearance and color. Thus, the user can easily notice the change of the lean indicator, knowing that the lean indicator has unfastened.

In the example, the central axis of the second pivotal portion is spaced from the two edges of the lean indicator to divide the lean indicator into a first half portion and a second half portion, and the first half portion has a first length different from a second length of the second half portion. Thus, the lean indicator can pivot under the unbalanced center of gravity.

In the example, the central axis of the second pivotal portion is spaced from the two edges of the lean indicator to divide the lean indicator into a first half portion and a second half portion, and a weighting member is mounted on the first half portion or the second half portion. Thus, the lean indicator can pivot under the unbalanced center of gravity.

In the example, the central axis of the second pivotal portion is spaced from the two edges of the lean indicator to divide the lean indicator into a first half portion and a second half portion, and the first half portion has a first area different from a second area of the second half portion. Thus, the lean indicator can pivot under the unbalanced center of gravity.

In the example, the central axis of the second pivotal portion is spaced from the two edges of the lean indicator to divide the lean indicator into a first half portion and a second half portion, and the first half portion has a first thickness different from a second thickness of the second half portion. Thus, the lean indicator can pivot under the unbalanced center of gravity.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
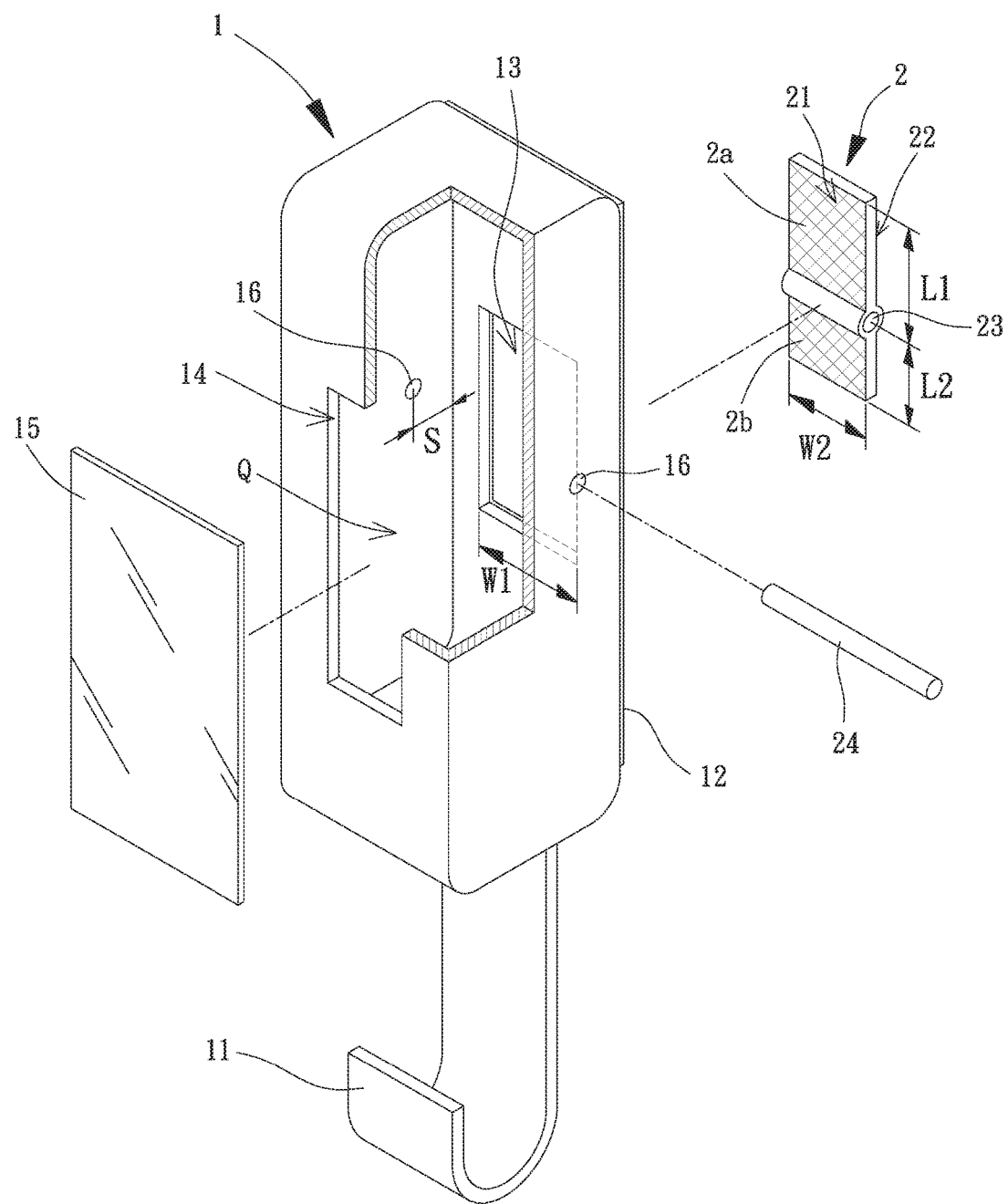
FIG. 1 is a perspective, exploded view of a hook assembly according to an embodiment of the invention.

In the various figures of the drawings, the same numerals designate the same or similar parts. Furthermore, when the terms "first", "second", "third", "fourth", "inner", "outer", "top", "bottom", "front", "rear", "axial", "radial", "longitudinal", "transverse", "length", "width", "height" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

FIG. 1 is a perspective view of a hook assembly according to a first embodiment of the invention. The hook assembly includes a base 1 and a lean indicator 2 pivotally mounted in the base 1.

The base 1 is in the form of a box having a chamber Q. In this embodiment, the base 1 is rectangular and includes a hook portion 11 and an adhesion portion 12. The hook portion 11 is provided on the bottom of the base 1. The adhesion portion 12 is provided on a back plate of the base 1. The adhesion portion 12 may be a layer of conventional adhesion agent which is directly attached to the back plate of the base 1. However, the layer of adhesion agent may be indirectly connected to the back plate of the base 1 (via intermediate layer). An opening 13 is provided on the back side of the base 1 and extends through the back plate and the adhesion portion 12. The opening 13 has a first width W1. The base 1 further includes a window portion 14. The window portion 14 is formed on any face of the base 1 and intercommunicates with the chamber Q such that the user can see through the chamber Q. In this embodiment, the opening 13 is formed on a front plate of the base 1 opposite to the back plate of the base 1. The window portion 14 is preferably provided with a transparent panel 15. The base 1 further includes two corresponding first pivotal portions 16 that are provided on two opposite lateral plates of the base 1, respectively. The center of each first pivotal portion 16 is spaced from a wall or a planar surface at a spacing S.

The lean indicator 2 is pivotally mounted in the chamber Q of the base 1. The lean indicator 2 includes a first face 21 and a second face 22 which are different from each other in terms of at least one of the factors including shape, appearance and color. In this embodiment, the first face 21 and the second face 22 have colors that are remarkably different, providing a notable effect in showing the feature difference. The lean indicator 2 further includes a second pivotal portion 23 connected to the two first pivotal portions 16 of the base 1. In this embodiment, the second pivotal portion 23 is in the form of a hole extending through the lean indicator 2 from one lateral side to another lateral side of the lean indicator 2. At this point, a pivoting member 24 extends through the hole and protrudes beyond the two lateral sides of the lean indicator 2. In this arrangement, two ends of the pivoting member 24 are pivotally connected to the two first pivotal portions 16, respectively. The lean indicator 2 has a second width W2 smaller than the first width W1.

The lean indicator 2 is divided into a first half portion 2a and a second half portion 2b. A central axis of the second pivotal portion 23 is spaced from two edges of the lean indicator 2 at two distances, respectively. Each of the distances is larger than the spacing S. In this embodiment, as shown in FIG. 1, the central axis of the second pivotal portion 23 is spaced from the two edges of the lean indicator 2 at a first length L1 and a second length L2, respectively. The first length L1 is larger than the second length L2. The second length L2 is slightly larger than the spacing S. The central axis of the second pivotal portion 23 does not pass through the center of gravity of the lean indicator 2. In this regard, the center of gravity of the lean indicator 2 is in the first half portion 2a. As the center of gravity of the lean indicator 2 is in the upper portion of the lean indicator 2, the lean indicator 2 is liable to pivot about the central axis of the second pivotal portion 23 while one of the two edges of the lean indicator 2 is able to pass through the opening 13. In this embodiment, the center of gravity of the lean indicator 2 is determined by the difference in length between the first half portion 2a and the second half portion 2b. Besides, a weighting member may be mounted on the first half portion 2a or the second half portion 2b. Alternatively, the first half portion 2a may have a surface area different from that of the second half portion 2b. Still alternatively, the first half portion 2a may have a thickness different from that of the second half portion 2b. According to the above, the center of gravity of the lean indicator 2 is located on the first half portion 2a or the second half portion 2b, permitting the first half portion 2a to remain liable to pivot about the central axis of the second pivotal portion 23.

Figure 2:
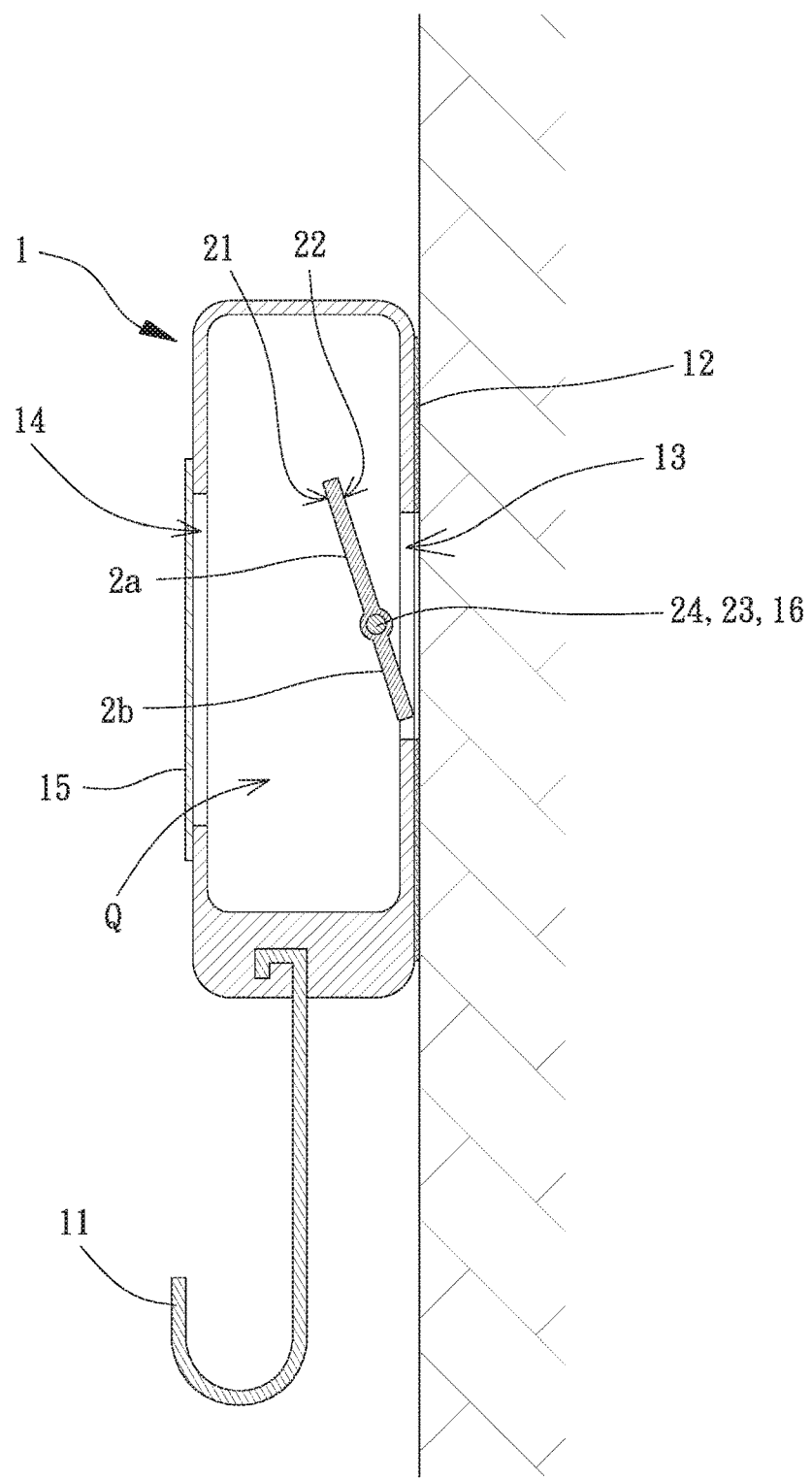
FIG. 2 is a cross sectional view of the hook assembly of the embodiment of the invention showing a normal condition thereof.

Referring to FIG. 2, in the initial stage of the use of the hook assembly according to the invention, the user pivots the lean indicator 2 to have the second half portion 2b located below the first half portion 2a where the center of gravity of the lean indicator 2 is. Then, the adhesion portion 12 of the base 1 is adhered to the wall or the planar surface perpendicular to the horizontal plane, securing the base 1 to the wall or the planar surface. Since the second width W2 is smaller than the first width W1 and the second length L2 is slightly larger than the spacing S, the edge of the lean indicator 2 which adjoins the second half portion 2b is able to pass through the opening 13 and abut the wall or the planar surface. In this arrangement, the first half portion 2a of the lean indicator 2 can remain liable to pivot about the central axis of the second pivotal portion 23. In this regard, the first face 21 of the lean indicator 2 remains facing the window portion 14, showing the user that the hook assembly is securely attached to the wall or planar surface.

Figure 3:
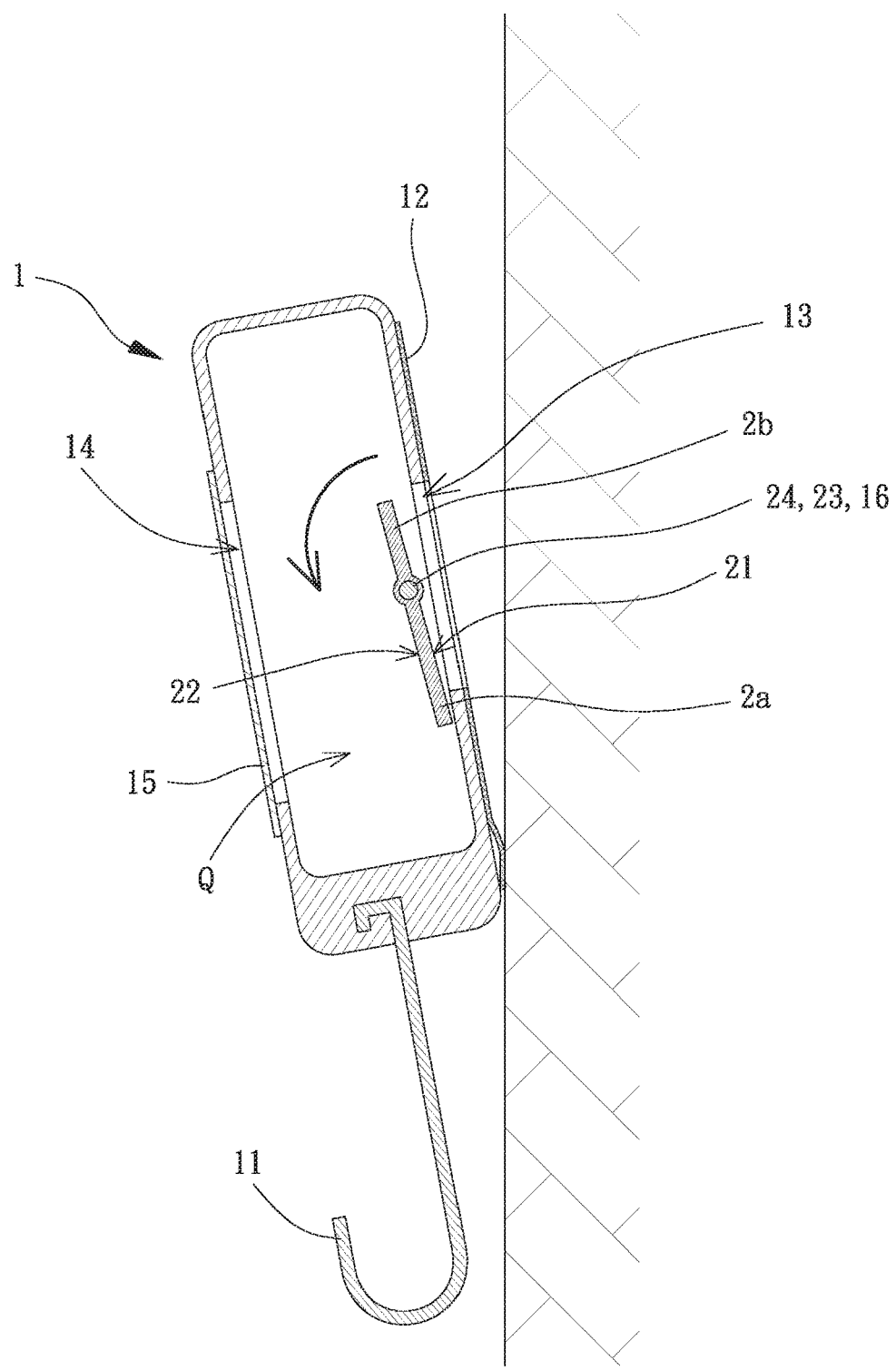
FIG. 3 is a cross sectional view of the hook assembly of the embodiment of the invention showing an abnormal condition where the hook assembly has unfastened and nearly detaches from the wall.

Referring to FIG. 3, when the hook assembly starts to unfasten and detaches from the base 1, the upper part of the lean indicator 2 leans away from the wall (or planar surface) and the base 1 tilts. As the first half portion 2a of the lean indicator 2 remains liable to pivot about the central axis of the second pivotal portion 23, the edge of the lean indicator 2 which adjoins the second half portion 2b can no longer abut the wall (or planar surface) once the spacing S becomes larger than the second length L2. As a result, the lean indicator 2 pivots downwards about the central axis of the second pivotal portion 23, turning the lean indicator 2 over. In this situation, the second face 22 of the lean indicator 2 faces the window portion 14, such that the user can be aware of the abnormal condition of the window portion 14 according to the color difference between the first face 21 and the second face 22.

In summary, the base of the hook assembly according to the invention can lean when the base unfastens and detaches from the wall. Since the center of gravity of the lean indicator is located above the second pivotal portion, the lean indicator can remain liable to pivot downwards under the unbalanced center of gravity. As a result, the lean indicator turns over and the second face faces the window portion. Due to the feature difference between the first and second faces of the lean indicator, it is able to observe whether the lean indicator has unfastened. As a result, the user can be aware of the abnormal condition of the hook assembly, preventing the articles from dropping which adversely causes damage to the article and hurts the people around. Furthermore, the hook assembly according to the invention does not require electricity and is still able to provide the user with a notification function.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A hook assembly comprising:
    a base having a chamber, wherein the base includes an adhesion portion, an opening and a window portion, wherein the adhesion portion is configured to be adhered to a surface, wherein the adhesion portion and the opening are provided on a back plate of the base, wherein the opening extends through the back plate of the base and the adhesion portion, wherein the opening has a first width, wherein the window portion intercommunicates with the chamber of the base, wherein the base includes two first pivotal portions respectively provided on two opposite lateral plates of the base, and wherein a center of each of the two first pivotal portions is spaced from the surface at a spacing;
    a hook portion provided on a bottom of the base; and
    a lean indicator pivotally mounted in the chamber of the base via a second pivotal portion, wherein the lean indicator includes a first face and a second face, wherein the first face has a feature different from that of the second face, wherein the lean indicator has a second width smaller than the first width, wherein a central axis of the second pivotal portion does not pass through a center of gravity of the lean indicator, wherein the central axis of the second pivotal portion is spaced from each of two edges of the lean indicator at a distance, and wherein the distance is slightly larger than the spacing.

2. The hook assembly as claimed in claim 1, further comprising a transparent panel coupled with the window portion.

3. The hook assembly as claimed in claim 1, wherein the second pivotal portion is in a form of a hole extending through the lean indicator from one lateral side to another lateral side of the lean indicator, and wherein a pivoting member extends through the hole and protrudes beyond the lateral sides of the lean indicator.

4. The hook assembly as claimed in claim 1, wherein the feature includes at least one of shape, appearance and color.

5. The hook assembly as claimed in claim 1, wherein the central axis of the second pivotal portion is spaced from the two edges of the lean indicator to divide the lean indicator into a first half portion and a second half portion, and wherein the first half portion has a first length different from a second length of the second half portion.

6. The hook assembly as claimed in claim 1, wherein the central axis of the second pivotal portion is spaced from the two edges of the lean indicator to divide the lean indicator into a first half portion and a second half portion, and wherein a weighting member is mounted on the first half portion or the second half portion.

7. The hook assembly as claimed in claim 1, wherein the central axis of the second pivotal portion is spaced from the two edges of the lean indicator to divide the lean indicator into a first half portion and a second half portion, and wherein the first half portion has a first area different from a second area of the second half portion.

8. The hook assembly as claimed in claim 1, wherein the central axis of the second pivotal portion is spaced from the two edges of the lean indicator to divide the lean indicator into a first half portion and a second half portion, and wherein the first half portion has a first thickness different from a second thickness of the second half portion.

* * * * *